United States Patent
Nylander et al.

(10) Patent No.: US 9,143,999 B2
(45) Date of Patent: Sep. 22, 2015

(54) METHOD FOR HANDLING HANDOVER IN A COMMUNICATION NETWORK

(75) Inventors: Tomas Nylander, Varmdo (SE); Jari Vikberg, Jarna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 224 days.

(21) Appl. No.: 13/700,502

(22) PCT Filed: Jun. 23, 2010

(86) PCT No.: PCT/SE2010/050721
§ 371 (c)(1),
(2), (4) Date: Nov. 28, 2012

(87) PCT Pub. No.: WO2011/162654
PCT Pub. Date: Dec. 29, 2011

(65) Prior Publication Data
US 2013/0084870 A1  Apr. 4, 2013

(51) Int. Cl.
*H04W 36/24* (2009.01)
*H04W 36/00* (2009.01)
*H04W 48/20* (2009.01)
*H04W 36/04* (2009.01)
*H04W 36/32* (2009.01)

(52) U.S. Cl.
CPC .......... *H04W 36/24* (2013.01); *H04W 36/0061* (2013.01); *H04W 36/04* (2013.01); *H04W 36/32* (2013.01); *H04W 48/20* (2013.01)

(58) Field of Classification Search
CPC . H04W 36/0083; H04W 36/30; H04W 92/02; H04W 24/02; H04W 74/0866; H04W 48/18; H04W 48/20; H04W 36/0061; H04B 17/382

USPC .................. 455/436, 438; 370/331
See application file for complete search history.

(56) References Cited

U.S. PATENT DOCUMENTS

| | | | |
|---|---|---|---|
| 2007/0191013 A1* | 8/2007 | Gunnarsson et al. | 455/438 |
| 2010/0113002 A1* | 5/2010 | Joko et al. | 455/422.1 |
| 2010/0120434 A1* | 5/2010 | Hasegawa | 455/436 |
| 2010/0246440 A1* | 9/2010 | Catovic | 370/254 |
| 2010/0285802 A1* | 11/2010 | Ahluwalia et al. | 455/436 |
| 2013/0005344 A1* | 1/2013 | Dimou et al. | 455/441 |

FOREIGN PATENT DOCUMENTS

| WO | WO 2010/049243 A1 | 5/2010 |
|---|---|---|
| WO | WO 2010/050885 A1 | 5/2010 |

OTHER PUBLICATIONS

International Search Report, Application No. PCT/SE2010/050721, Mar. 1, 2011.
3GPP, R3-090823;3GPP TSG-RAN3 Meeting #63bis; Seoul, Korea, Mar. 23-26, 2009, http://ftp.3gpp.org/specs/html-info/TDocExMtg--R3-63b--27337.htm, 15 pp.

(Continued)

*Primary Examiner* — Nizar Sivji
(74) *Attorney, Agent, or Firm* — Myers Bigel Sibley & Sajovec, PA

(57) ABSTRACT

The present solution relates to a method in a first network node (301) for handling handover of a user equipment (105) from a source cell (303) to a target cell (309) in a communication network (300). The first network node (301) selects (504) the target cell (309) from neighbor cells (309) based on information of cell size, which target cell (309) will be used for handover the user equipment (105) to.

7 Claims, 11 Drawing Sheets

(56) References Cited

OTHER PUBLICATIONS

3GPP, R4-100178; 3GPP TSG-RAN WG4 #AdHoc1; Sophia Antipolis, FR, Jan. 18-22, 2010, http://3gpp.org/ftp/tsg_ran/WG4_Radio/TSGR4_AHs/R4_AH1_SophiaAntipolis_Jan_2010/docs/, 21 pp.

The Benefits of SON in LTE, Self-Optimizing and Self-Organizing Networks; Dec. 2009, http://www.3gamericas.org/document?2009_%203GA_LTE_SON_white_paper_12_15_09_Final.pdf, 26 pp.

* cited by examiner

METHOD FOR HANDLING HANDOVER IN A COMMUNICATION NETWORK

CROSS REFERENCE TO RELATED APPLICATION

This application is a 35 U.S.C. §371 national stage application of PCT International Application No. PCT/SE2010/050721, filed on 23 Jun. 2010, the disclosure and content of which is incorporated by reference herein in its entirety. The above-referenced PCT International Application was published in the English language as International Publication No. WO 2011/162654 A1 on 29 Dec. 2011.

TECHNICAL FIELD

This invention relates generally to a network node, a method in the network node, a user equipment and a method in the user equipment. More particularly this invention relates to handling handover of a user equipment from a source cell to a target cell in a communication network.

BACKGROUND

In a typical cellular system, also referred to as a wireless communications network, wireless terminals, also known as Mobile Stations (MS) and/or User Equipment units (UEs) communicate via Radio Access Networks (RAN) to a core network. The wireless terminals may be mobile stations or user equipments such as mobile telephones also known as cellular telephones, and laptops with wireless capability, e.g., mobile termination, and thus may be, for example, portable, pocket, hand-held, computer-included, or car-mounted mobile devices which communicate voice and/or data with radio access network.

The radio access network covers a geographical area which is divided into cell areas, with each cell area being controlled by a base station, e.g. a Radio Base Station (RBS), which in some radio access networks is also called eNodeB (eNB), NodeB or B node. A cell is a geographical area where radio coverage is provided by the radio base station at a base station site. Each cell is identified by an identity within the local radio area, which is broadcast in the cell. The base stations communicate over the air interface operating on radio frequencies with the user equipments within range of the base stations.

In some versions of the radio access network, several base stations are typically connected, e.g. by landlines or microwave, to a Radio Network Controller (RNC), as in Third Generation (3G), i.e. Wideband Code Division Multiple Access (WCDMA). The radio network controller supervises and coordinates various activities of the plural base stations connected thereto. In Second Generation (2G), i.e. Global System for Mobile communication (GSM), the base stations are connected to a Base Station Controller (BSC). The network controllers are typically connected to one or more core networks.

In an Evolved Universal Terrestrial Radio Access Network (E-UTRAN) radio access network the creation of neighbor relations to neighbor nodes is to a large extent automated by the Automatic Neighbor Relation (ANR) feature. ANR is a feature aiming to relieve the operator from needing to manually configure neighbor cell lists and associations, i.e. neighbor relation lists. It is currently only standardized in E-UTRAN eNodeBs and user equipments, but may be used to retrieve information about E-UTRAN, WCDMA and GSM neighbor cells.

FIG. 1, from a Third Generation Partnership Project (3GPP) Technical Specification (TS), shows the main principle of ANR in the case a new neighboring Long Term Evolution (LTE)/System Architecture Evolution (SAE) cell is detected. An eNB 101 controlling a source cell A has an ANR function. As a part of the normal procedures, the eNB 101 instructs a user equipment 105 to perform measurements on neighbor cells, e.g. cell B. The frequency of the measurements on neighbor cells depends on the logic implemented in the eNB 101, and may for example be periodical. The source cell A has Physical Cell ID (Phy CID)=3, and the cell B has Phy CID=5. The function works as follows:

Step 1

The user equipment 105 sends a measurement report regarding cell B to the eNB 101. This report comprises Cell B's Physical Cell ID (PCI), but not it's E-UTRAN Cell Global Identifier (ECGI). The report may comprise for example Phy-CID=5 and information that the signal from the cell B is strong.

Step 2

The eNB 101 instructs the user equipment 105, using the newly discovered PCI as parameter, to read the ECGI, indicated as Global-CID in FIG. 1, the Tracking Area Code (TAC) and all available Public Land Mobile Network Identity PLMN ID(s) of the related neighbor cell. To do so, the eNB 101 may need to schedule appropriate idle periods to allow the use equipment 105 to read the ECGI and the other information from the broadcast channel of the detected neighbor cell.

Step 3

The user equipment 105 reads system control information at cell B on the downlink Broadcast Control Channel (BCCH).

Step 4

When the user equipment 105 has obtained the ECGI of cell B, the user equipment 105 reports the detected ECGI to the eNB 101 controlling the source cell A. The source cell may also be called serving cell. In addition the user equipment 105 reports the TAC and all PLMN IDs that have been detected to the eNB 101.

Step 5 (Not Shown)

The eNB 101 decides to add this neighbor cell B to the neighbor relation list, and may use PCI and ECGI to update the neighbor relation list. If needed, it may setup a new X2 interface between eNB 101 and the new eNB 103. An X2 interface is the interface between two eNBs which supports exchange of signaling information between the eNBs.

This automatic addition of neighbor cells means that potentially "bad" neighbor cells are added and used as handover candidates which may decrease the handover performance, and which leads to an increased number of handovers.

The size of the source cell is configured into an eNB, this attribute is specified in 3GPP as the parameter cellSize providing the size of the cell coverage area of the source eNB. In 3GPP the parameter cellSize is specified with the values verysmall, small, medium, large. The information about cell size is only used in conjunction with a feature called "UE history" with the intention to detect toggling between cells, i.e. a eNB comprises this information when handing over a UE/session to another eNB. The UE history comprises information about cells that a UE has been controlled by in active state prior to the target cell.

SUMMARY

One objective according to at least some embodiments is therefore to provide a mechanism for improving handover performance.

According to a first aspect according to certain embodiments a method in a first network node for handling handover of a user equipment from a serving cell to a target cell in a communication network is provided. The first network node selects a target cell from neighbor cells based on information of cell size. The target cell will be used for handover the user equipment to.

According to a second aspect according to certain embodiments a method in a user equipment for handling information of cell size is provided. The user equipment is in communication with a first network node controlling a source cell. The user equipment detects a neighbor cell being a neighbor to the source cell and transmits information to the first network node that the neighbor cell is detected. The user equipment obtains information of cell size of the detected neighbor cell, and transmits the obtained information of cell size to the first network node enabling the base station to handle handover of the user equipment from the source cell to a target cell.

According to a third aspect according to certain embodiments a first network node for handling handover of a user equipment from a source cell to a target cell in a communication network is provided. The first network node comprises a selecting unit configured to select a target cell from the neighbor cells based on information of cell size. The target cell will be used for handover the user equipment to.

According to a fourth aspect according to certain embodiments a user equipment for handling information of cell size is provided. The user equipment is in communication with a first network node controlling a source cell. The user equipment comprises a detecting unit which is configured to detect a neighbor cell being a neighbor to the source cell. The user equipment comprises a transmitting unit configured to transmit information to the first network node that the neighbor cell is detected, and an obtaining unit configured to obtain information of cell size of the detected neighbor cell. The transmitting unit is further configured to transmit the obtained information of cell size to the first network node enabling the first network node to handle handover of the user equipment from a source cell to a target cell.

Since the first network node selects a target cell based on the information of cell size, and uses the information of cell size to avoid selecting target cells with small cell size, a mechanism for improved handover of the user equipment to the target cell is provided. According to some embodiments the number of handovers for a user equipment is reduced, and thus the handover performance is improved.

For instance, in a situation where a UE measures better radio characteristics, such as signal strength, from a small cell compared to the radio characteristics from a larger cell the network may never the less select the larger cell as a target cell for hand-over. This, may particularly be true if the speed of the UE is above a certain threshold, or it may depend on other UE characteristics, such as buffer size, that is how much data is available in the UE buffer, transmission speed or format etc.

On the other hand, in a situation where a UE measures less good radio characteristics, such as signal strength, from a small cell compared to the radio characteristics from a larger cell the network may never the less select the smaller cell as a target cell for hand-over. This may particularly be the case if the UE is stationary or semi-stationary or moving with a speed less than a certain threshold or it may depend on other UE characteristics, such as buffer size, that is how much data is available in the UE buffer, transmission speed or format etc.

In that regard it can be worth mentioning that the preference on smaller or larger cells depending on the UE speed may be combined so that if the UE has a speed above a first threshold a larger cell is preferred, and if the UE has a speed below a second threshold a smaller cell is preferred. The first and second threshold may be equal, but can also be different where the second threshold would be smaller than the first.

The present technology affords many advantages, one is that when a source eNB knows the size of the cell, a better selection of handover candidates is done. Another advantage is that the network load, i.e. signaling and processing, is reduced as a result of the present solution.

The present solution is not limited to the features and advantages mentioned above. A person skilled in the art will recognize additional features and advantages upon reading the following detailed description.

BRIEF DESCRIPTION OF THE DRAWINGS

The present solution will now be further described in more detail in the following detailed description by reference to the appended drawings illustrating embodiments of the present solution and in which.

The drawings are not necessarily to scale, emphasis is instead being placed upon illustrating the principle of the solution.

DETAILED DESCRIPTION

The basic principle of the present solution is to use information about cell size to optimize handover performance by selecting a target cell based on cell size.

Figure 2:
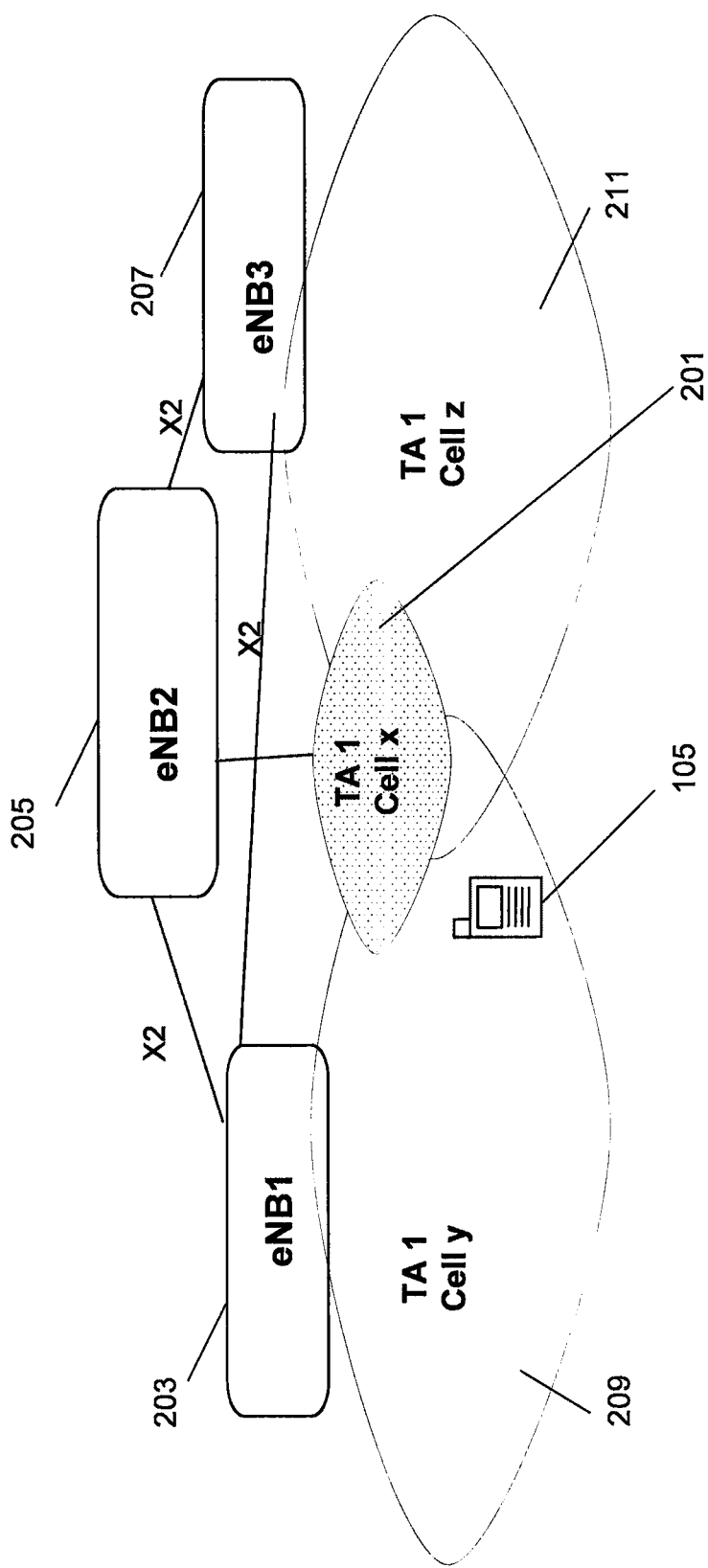
FIG. 2 is a block diagram illustrating handover to a small cell.

As part of the present invention, a problem will first be identified and discussed in relation to FIG. 2. It is assumed that Cell x 201 is a small cell controlled by eNB2 205. Small is related to geographical size of the cell's coverage area in this context. The eNB1 203 comprises an ANR function. The ANR function in eNB1 203 will report the presence of Cell x 201 to eNB1 203 and the ANR function in eNB3 207 will report the presence of Cell x 201 to eNB3 207, and those nodes, i.e. eNB1 203 and eNB 3 207, will add Cell x 201 as a neighbor in their information about neighbor cells, for example in a neighbor cell list. Then for example a user equipment 105 that has an active session in Cell y 209 is instructed to perform measurements on neighboring cells and reports results for Cell x 201 and Cell z 211. However since Cell x 201 is a small cell with limited coverage, it might not be the ideal target cell since a handover to Cell x 201 would most likely result in a new handover due to the limited coverage, especially for a fast moving user equipment 105. In some cases, since the user equipment 105 may have more cells to measure on, limited time may be spent on each measurement which has a negative impact on handover performance. The interface X2 connects the eNBs 203, 205, 207 among themselves.

Figure 3:
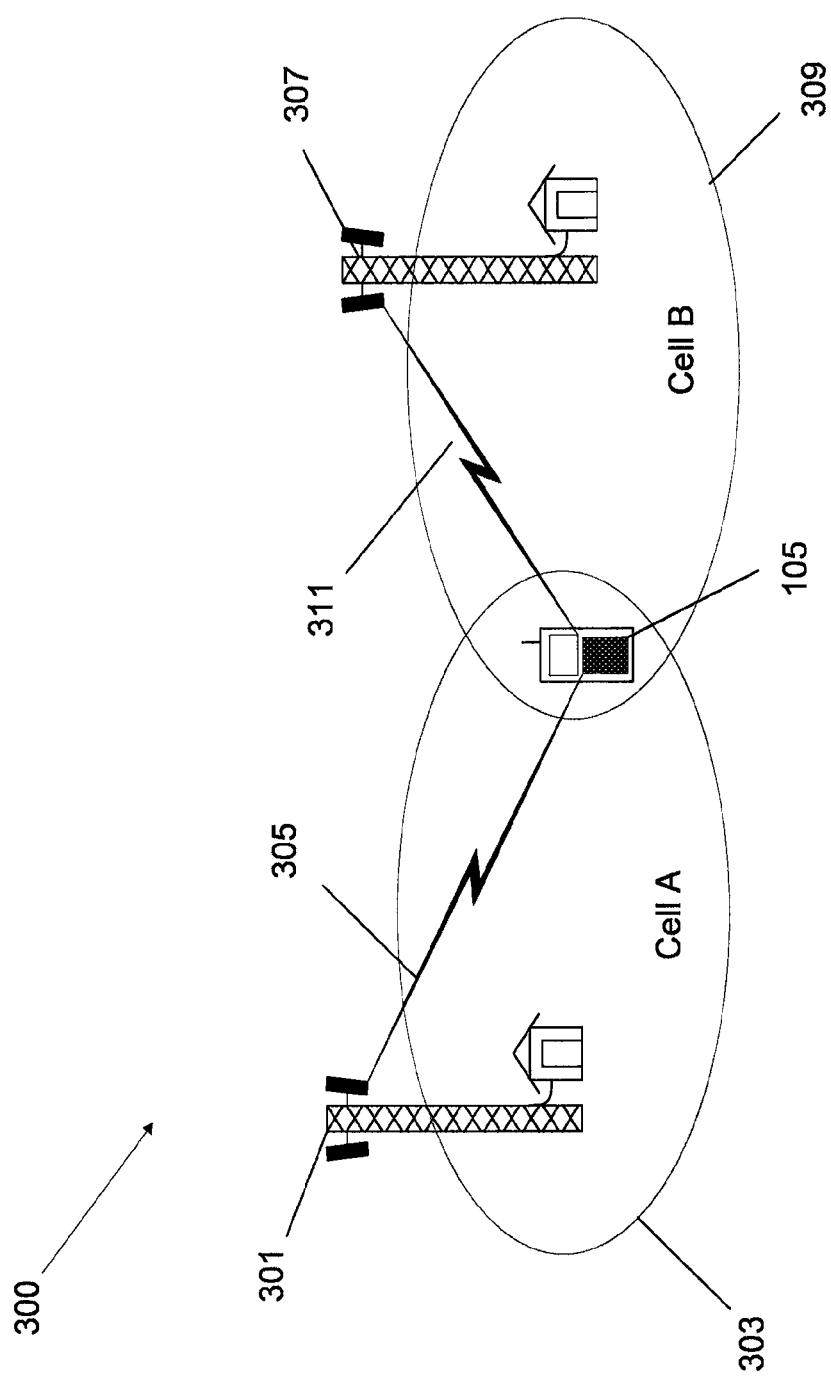
FIG. 3 is a schematic block diagram illustrating embodiments of a communication network.

FIG. 3 depicts a communications network 300. The communications network 300 may use technologies such as LTE, GSM, WCDMA, Code Division Multiple Access (CDMA), (Worldwide Interoperability for Microwave Access) WiMAX and CDMA2000. The communications network 300 comprises a first network node 301, e.g. a first base station, controlling a source cell A 303. The generic term first network node refers to eNodeB in the LTE system or a NodeB in a WCDMA system or for other base stations of other systems, or any other network node capable to communicate over a first radio carrier 305 with a user equipment 105 being present in the source cell A 303.

The user equipment 105 may be a mobile phone, a Personal Digital Assistant (PDA), or any other radio communications network unit capable to communicate with a network node, e.g. a base station, over a radio channel. The user equipment 105 is referred to as UE in some of the figures.

The communication network 300 further comprises a second network node 307 controlling a target cell B 309. The second network node 307 may be a base station such as a NodeB, an eNodeB or any other network unit capable to communicate over a second radio carrier 311 with the user equipment 105 when being present in cell B 309. In the example of FIG. 3, the cell B 309 is a neighbor cell to the cell A 303. The coverage areas of cell A 303 and cell B 309 partly overlap, so that the cells provide a continuous coverage.

An X2 interface (not shown) may connect the network nodes 301, 307 among themselves.

A network node 301, 307 may control one or more cells.

During an active session, i.e., while maintaining a connection with or via a cellular network, the user equipment 105, moves for example from the source cell A 303 towards the neighbor target cell B 309. When the network determines that the user equipment 105 is better controlled by target cell B 309, a handover of the user equipment 105 is performed from the first network node 301 to the second network node 307. The time for triggering the handover is dependant on signal quality measurements and handover algorithms.

The present solution method for optimizing handover performance, according to some embodiments will now be described with reference to the combined signaling diagrams and flowcharts depicted in FIGS. 4a-e, in view of FIG. 3 illustrating a communication network 300. FIG. 4 shows the following four example variants of the present solution method.

Variant 1: X2 Extended to Convey Cell Size

Figure 4A:
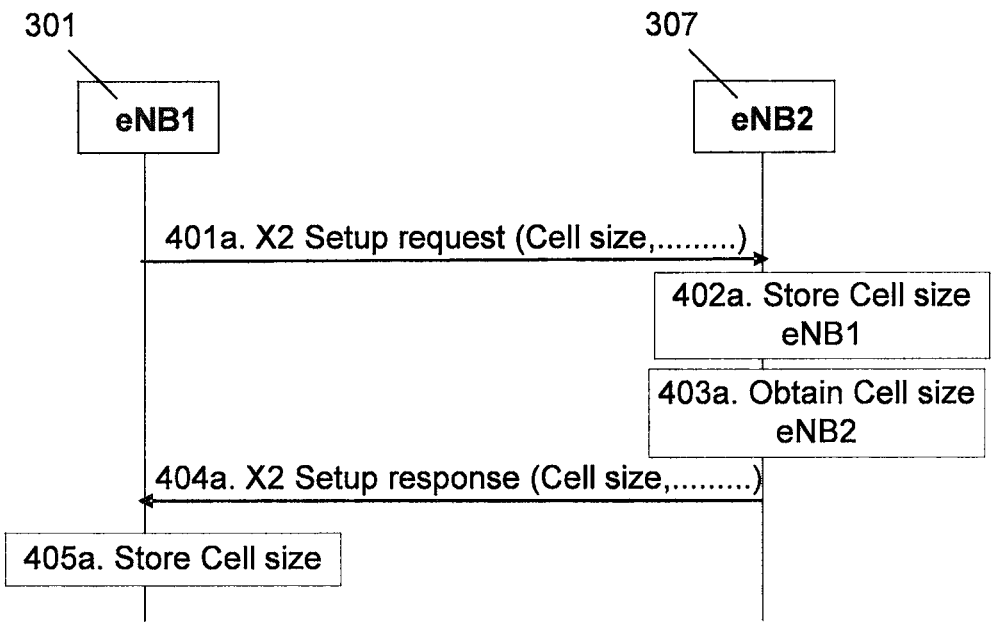
FIG. 4a-e are signaling diagrams illustrating embodiments of a method.
Figure 4B:
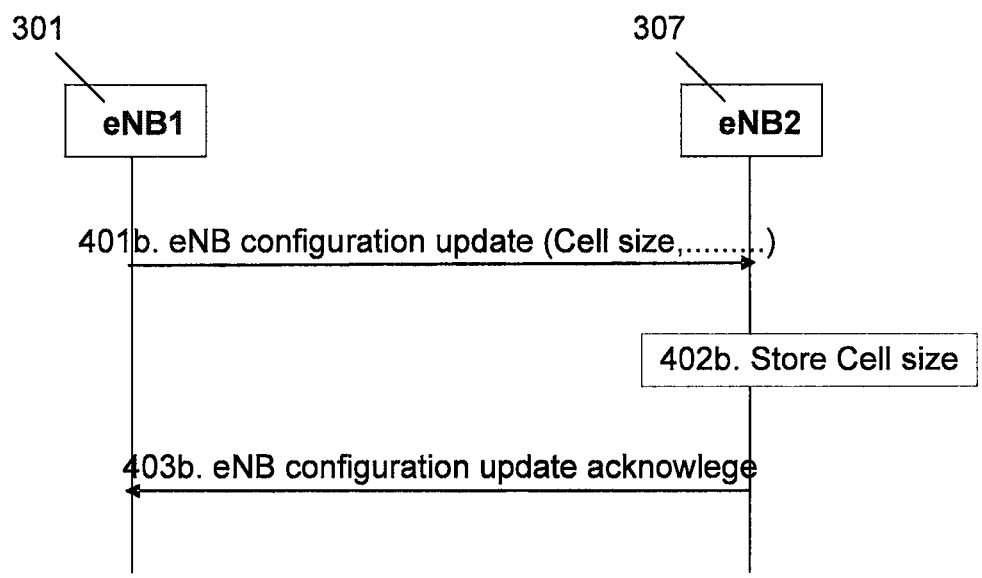

Variant 1 comprises two embodiments which are illustrated in FIGS. 4a and 4b. The first embodiment illustrated in FIG. 4a conveys information about cell size during an X2 setup, or during the eNB update procedures as in the second embodiment illustrated in FIG. 4b. This variant allows the dynamic detection of the cell size of neighboring E-UTRAN cells in eNodeB. In prior art techniques, the information about cell size is not distributed to neighbor network nodes, e.g. eNBs, neither with ANR, nor during the X2 setup. The solution method presented in variant 1 is transparent to the user equipment 105. It is the network which is responsible for the implementation of variant 1.

"Cell size" may be defined as the geographical size of the coverage area of the cell, or it may be defined as a relation in a hierarchical cell structure i.e. a cell that is lower down in the hierarchy is smaller than a cell higher up.

The present solution method according to the first embodiment of variant 1 comprises the following steps during X2 setup, i.e. setup of an X2 interface between the first network node eNB1 301 and the second network node eNB2 307:

Step 401a

The first network node eNB1 301 sends an X2 Setup Request comprising information of its own controlled cells and cell size of each of these to a second network node eNB2 307, and requesting information of the cells controlled by the second network node eNB2 307, and cell sizes of these cells.

Step 402a

The second network node eNB2 307 stores the received information about controlled cells and cell size from the first network node eNB1 301 in e.g. a database or a memory. The information may be stored in a neighbor cell list.

Step 403a

The second network node eNB2 307 obtains information about the cells controlled by the second network node 2NB2 307, and the size of these cells.

Step 404a

The first network node eNB1 301 receives an X2 Setup Response with information of controlled cells and cell size of each of these from the second network node eNB2 307, as a response to the X2 Setup Request sent in step 401a.

Step 405a

The first network node eNB1 301 stores the received information about the controlled cells and cell size of the second network node eNB2 307 in e.g. a database or a memory. The information may be stored in a neighbor cell list.

The present solution method according to the second embodiment of variant 1 comprises the following steps when the information about cell size is conveyed during eNB update procedure as illustrated in FIG. 4b:

Step 401b

The first network node eNB1 301 sends an eNB configuration update to the second network node eNB2 307 comprising information about the cells and cell sizes of the cells controlled by the first network node eNB1. The first network node eNB1 301 does not need any request to send the information about cell size to the second network node eNB2 307. It sends the cell size information in the eNB configuration update message each time the eNB configuration needs to be updated.

Step 402b

The second network node eNB2 307 stores the received information about cells controlled by the first network node eNB1 301 and their cell size in e.g. a database or a memory. The information may be stored in a neighbor cell list.

Step 403b

The first network node eNB1 301 receives an eNB configuration update acknowledge message from the second network node eNB2 307.

In current 3GPP specifications for X2, extended information about cells is sent in the "served cell information" parameter in X2 Setup Request, X2 Setup Response and eNB Configuration Update messages. These messages may be enhanced to also comprise information about the cell size, for example within the "served cell information" parameter.

This is a straightforward way to convey this information since it is during this phase information concerning neighbor relations are exchanged, and it does not impact the user equipment 105.

Variant 2: System Information Broadcast and ANR Extended with Cell Size

Figure 4C:
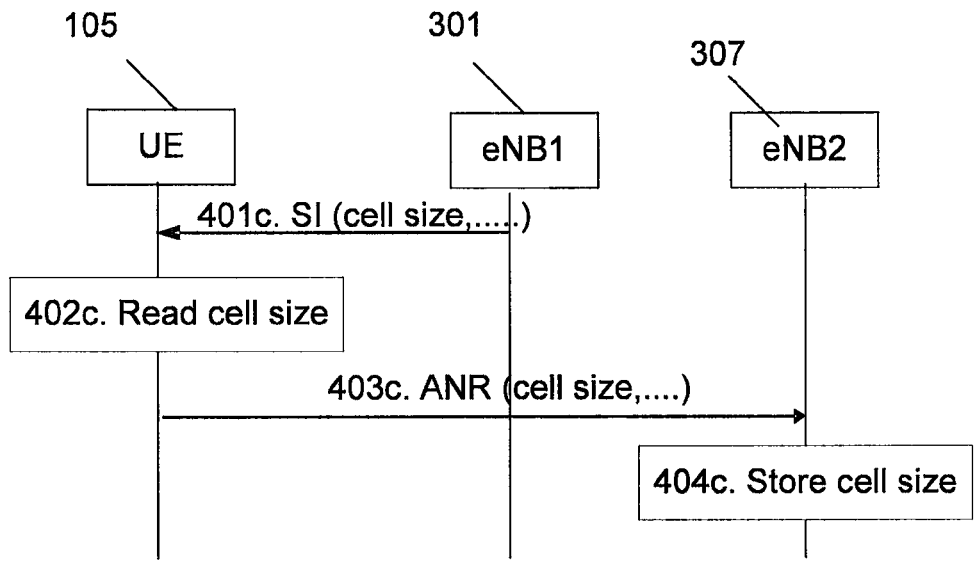

In variant 2, illustrated in FIG. 4c, information about cell size may be comprised in a system information broadcast message, and ANR reporting is extended to comprise the cell size information. In an LTE-case, an eNB, comprises information about the cell size in some system information message and a user equipment 105 performing system information reading related to ANR also reads the cell size information and comprises it in the reporting to the requesting eNB. When the first network node eNB1 301 asks the user equipment 105 to provide the Global CID, as shown as step 2 in FIG. 1, the user equipment 105 may also report the cell size at the same time. In other words, in some embodiments, there is no specific request for the cell size information, but the cell size is a part of a package that the user equipment 105 reports to the eNB2 307.

The user equipment 105 may act as an intermediate unit for transferring information of cell size from one network node to another network node.

Already today it is possible to use ANR for Universal Terrestrial Radio Access Network (UTRAN) and GSM Edge Radio Access Network (GERAN) cells when the user equipment 105 is in E-UTRAN. If ANR is defined for usage in UTRAN and GERAN then this variant applies for usage in these technologies as well. For those technologies, the network node responsible for the system information broadcast would be a RNC or a Base station Controller (BSC), respectively.

Variant 2 requires implementation in the user equipment 105 as well as in the first network node 301 and the second network node 307, i.e. the eNBs.

The present solution method according to variant 2 comprises the following steps when the information about cell size is conveyed with system information broadcast and ANR. In this case, the user equipment 105 is being served by the second network node eNB 307 in cell B 309:

Step 401c

The first network node eNB1 301 sends a system information broadcast message comprising the cell size of the cells controlled by the first network node eNB1 301 to the user equipment 105. The system information broadcast message may be heard by everyone in the coverage area of the source cell 303, including the user equipment 105. Even though FIG. 4c shows that it is the first network node eNB1 301 that sends the system information broadcast message, the message may also be sent by a RNC or BSC.

Step 402c

The user equipment 105 reads the system information broadcast message comprising the cell size information of the first network node eNB1 301.

Step 403c

Figure 1:
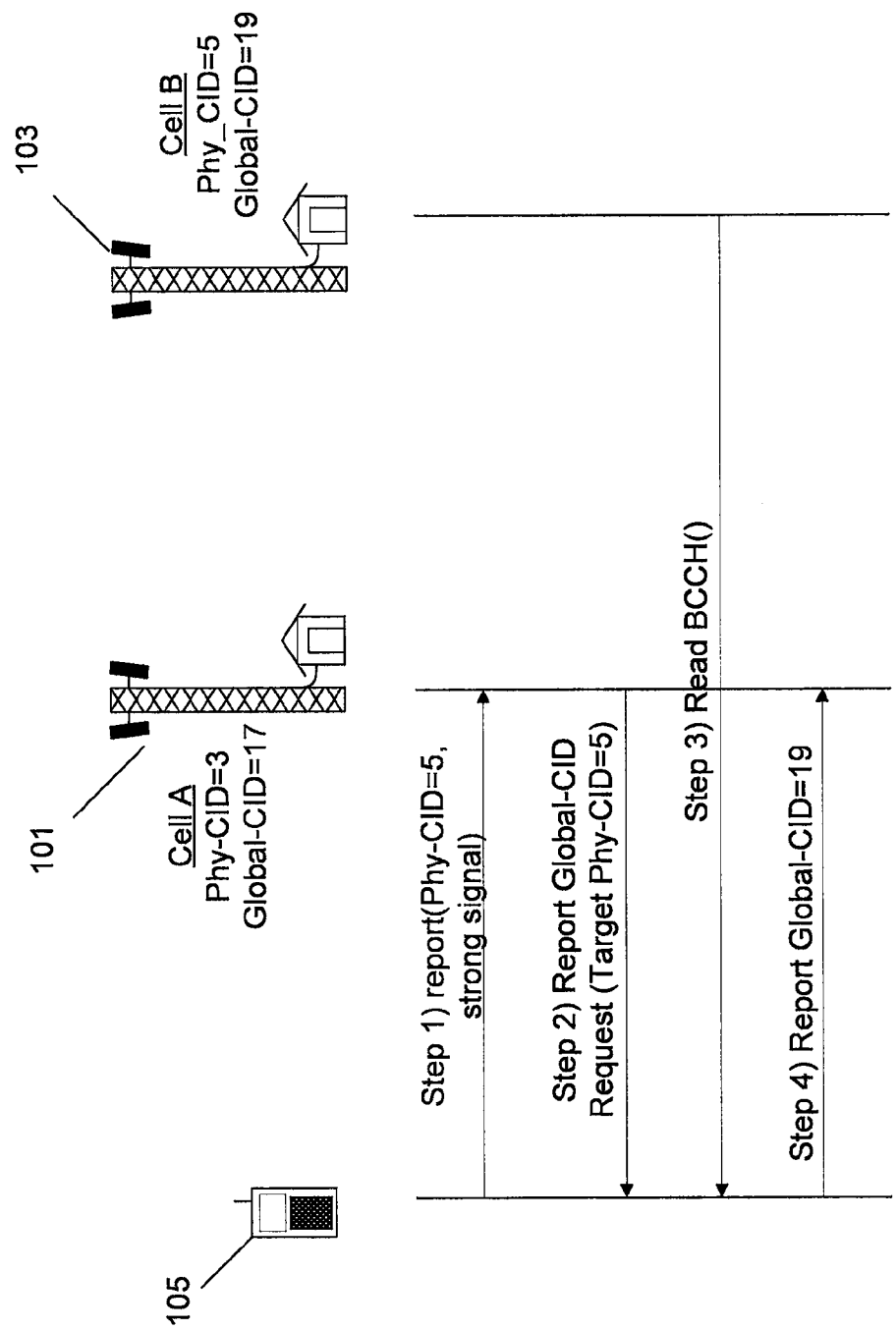
FIG. 1 is a signaling diagram illustrating the main principle of Automatic Neighbor Relation.

The user equipment 105 transmits the read information of cell size in the ANR procedure, for example using the methods shown in FIG. 1, to the second network node eNB2 307.

Step 404c

The second network node eNB2 307 receives and stores the information of cell size for example in a neighbor cell list.

Variant 3: Learning from Incoming Handovers

Figure 4D:
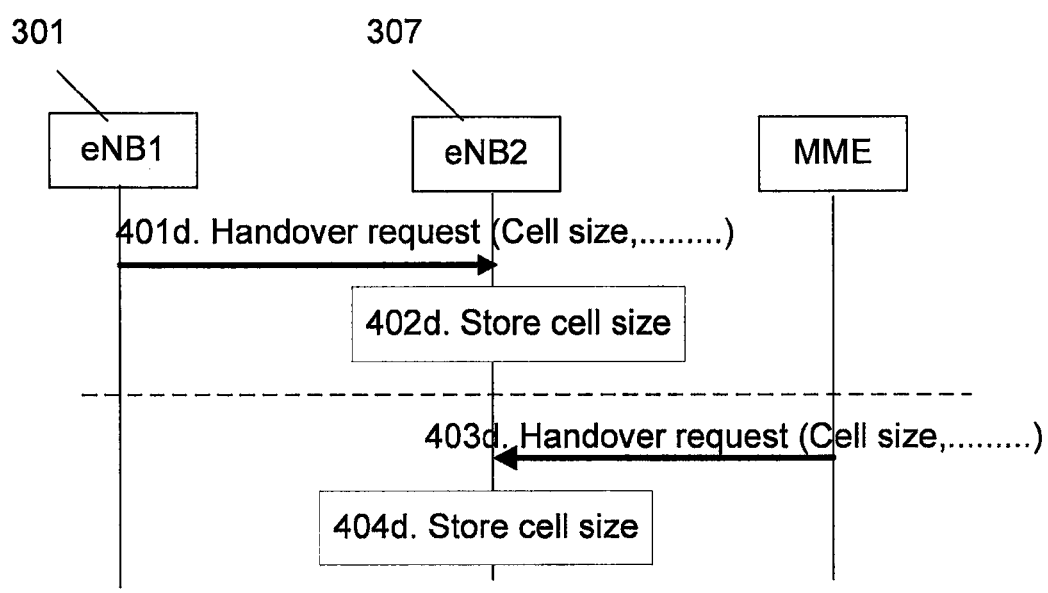

In this variant, illustrated in FIG. 4d, a network node, such as a base station or network controller, initiating a handover to an eNB should comprise the UE history parameter in the Handover request message during the handover preparation signaling.

The first network node 301 and the second network node 307 may learn the information of cell sizes of its neighbor cells over time by looking at received information, e.g. UE history, at an incoming handover. In other words, what the cell size of the source cell 303 controlled by the first network node 301 was and then use this information to optimize the neighbor lists and handover performance when the node itself is a source. This also means that the network nodes eNB may learn the cell size of any previous cell comprised in the UE History information i.e. it does not necessarily need to be the last cell before handover to this network node eNB. Except from the cell size, the UE history may comprise information about for example cell identifier, time spent in cell, etc. This variant allows the dynamic detection of the cell size of neighboring E-UTRAN, UTRAN and GERAN cells in eNodeB, RNC and BSC.

The UE History may also be used in handovers towards and from BSC and/or RNC, so the dynamic learning of the cell size applies for GSM and WCDMA as well.

Another variant is that the "Source Cell" or "Serving Cell" information in the handover/relocation preparation phase is extended with cell size information. This information may be transferred in the transparent RAN containers or in any other signaling via the core network or directly between the network nodes. This variant would allow the target eNB, BSC or RNC to learn the cell size of the last cell before handover.

This method solves the problem in a backward way since information related to individual user equipment sessions are used as input to the overall handling of neighbor relations. This method also relies on the presence of incoming handovers, e.g. that configurations in neighbor network nodes allow handovers to this network node. One benefit with this variant 3 is that the optimization may be done without standardization.

The network is responsible for this variant and it is transparent to the user equipment 105.

The present solution method according to variant 3 comprises the following steps when the information about cell size is learned from incoming handovers.

Step 401d

The first network node eNB1 301 transmits a handover request to the second network node eNB2 307 via an X2 interface comprising the information of the cell size of the source cell 303 controlled by the first network node eNB1 301. The first network node eNB1 301 transmits information of the cell size to the second network node eNB2 307 on its own initiative, i.e. without the second network node eNB2 307 asking for it.

The second network node eNB2 307 may also reply with its, i.e. the target, cell size in the response to the handover request/required. In other words, the second network node eNB2 307 transmits a handover response message to the first network node eNB1 301 comprising information of cell size of the target cell 309.

Step 402d

The second network node eNB2 307 receives and stores information of the cell size of the source cell 303 controlled by first network node eNB1. The information of cell size may be stored in a neighbor cell list.

Step 403d

Steps 403d and 404d are alternatives to step 401d and 402d, as indicated by the dotted line, and is the case where there is no X2 interface established between the first network node eNB1 301 and second network ndoe eNB2 307, or where there is no handover between different Radio Access Technologies (RAT). The source RAT sends the handover request via the core network, i.e. Mobility Management Entity (MME) for SAE, and may include the cell size in a RAN transparent container.

The target RAT, e.g. second network node eNB2 307 may also reply with its, i.e. the target, cell size in the response to the handover request/required. In other words, the second network node eNB2 307 transmits a handover response message to the MME comprising information of cell size of the target cell. The handover response message is then routed to the network node controlling the source cell 303 via the core network, i.e. the first network node eNB1 301.

Step 404d

The second network node eNB2 307 receives and stores information of the cell size of the source cell 303 controlled by the first network node eNB1 301. The information of cell size may be stored in a neighbor cell list.

Variant 4: RIM-Based Method

Figure 4E:
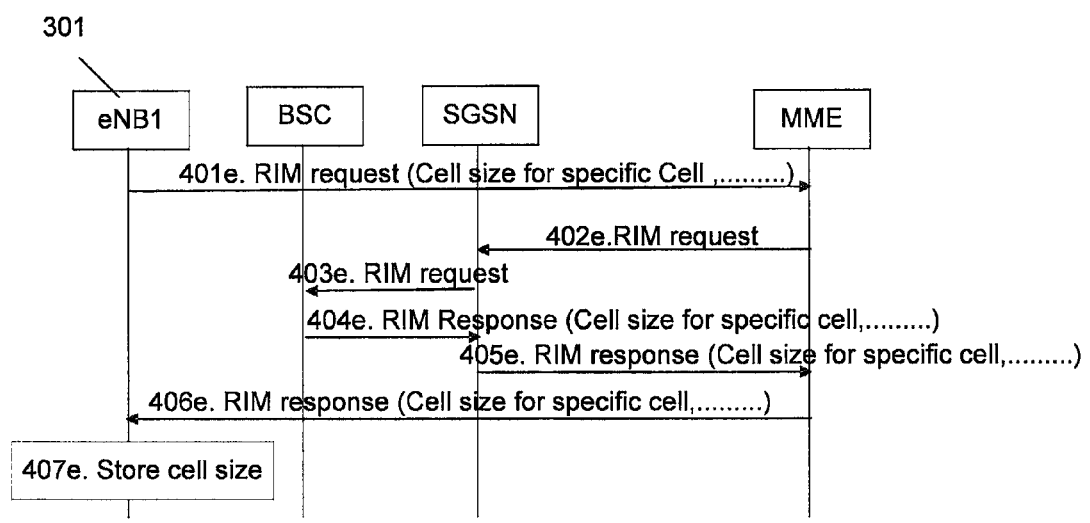

This variant is based on definition of a new RAN Information Management (RIM) application and procedures that allows the network nodes, i.e. eNodeB, RNC and/or BSC, to retrieve cell size information about the different neighboring cells, as illustrated in FIG. 4e. This variant allows the dynamic detection of the cell size of neighboring E-UTRAN, UTRAN and GERAN cells in BSC, RNC and eNodeB. For example an eNB may ask a BSC or RNC for the cell size of a specific cell. The FIG. 4e shows the example when the first network node eNB1 301 uses RIM to request cell size information about a GERAN cell that is controlled by the shown BSC. The target cell is a GERAN cell instead of an E-UTRAN cell.

Variant 4 requires for example a definition of a protocol to be able to retrieve the cell size information.

The present solution method according to variant 4 comprises the following steps when the information about cell size is provided using a RIM-based method.

Step 401e

It may be assumed that for example the ANR function of the first network node eNB 301 has indicated that a GERAN cell is a neighbor cell. Then, the first network node eNB1 301 sends a RIM request message to the MME requesting information of the cell size of the GERAN cell controlled by the BSC.

Step 402e

The MME routes the request message from the first network node eNB1 301 to the Serving General Packet Radio Service (GPRS) Support Node (SGSN). The SGSN comprises information about which BSC that controls the target cell in question, which is the final destination of the request message.

Step 403e

The SGSN routes the request message received from the MME to the BSC, which is the node controlling the neighbor target cell.

Step 404e

The BSC sends a RIM Response to the SGSN with the requested cell size for the target cell.

Step 405e

The SGSN routes the RIM response comprising the cell size to the MME.

Step 406e

The MME routes the RIM response comprising the cell size to the first network node eNB1 301.

Step 407e

The first network node eNB1 301 receives and stores information of the cell size of the source cell 303. The information of cell size may be stored in a neighbor cell list, e.g. in a database or memory.

As a final step, not shown, for all FIGS. 4a-e, handover may be performed using a target cell 309 selected based on the cell size. Neighbor cells having small size may be avoided in some cases.

Figure 5:
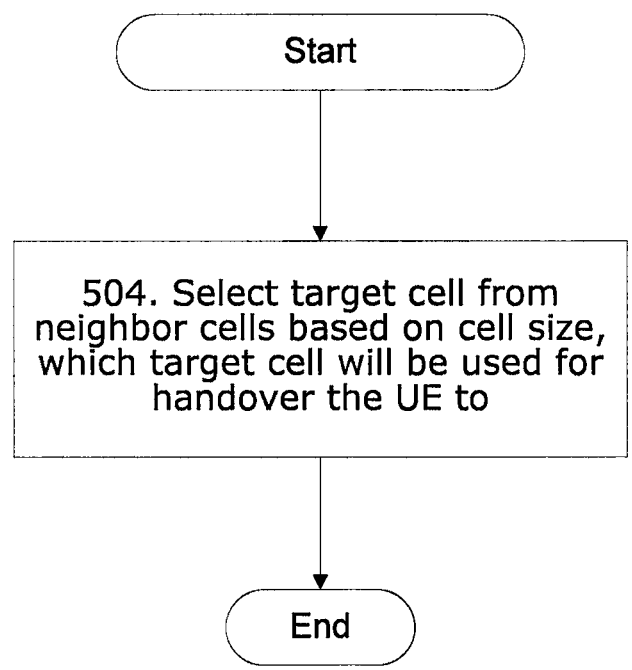
FIG. 5 is a flow diagram illustrating embodiments of a method in a first network node.
Figure 6:
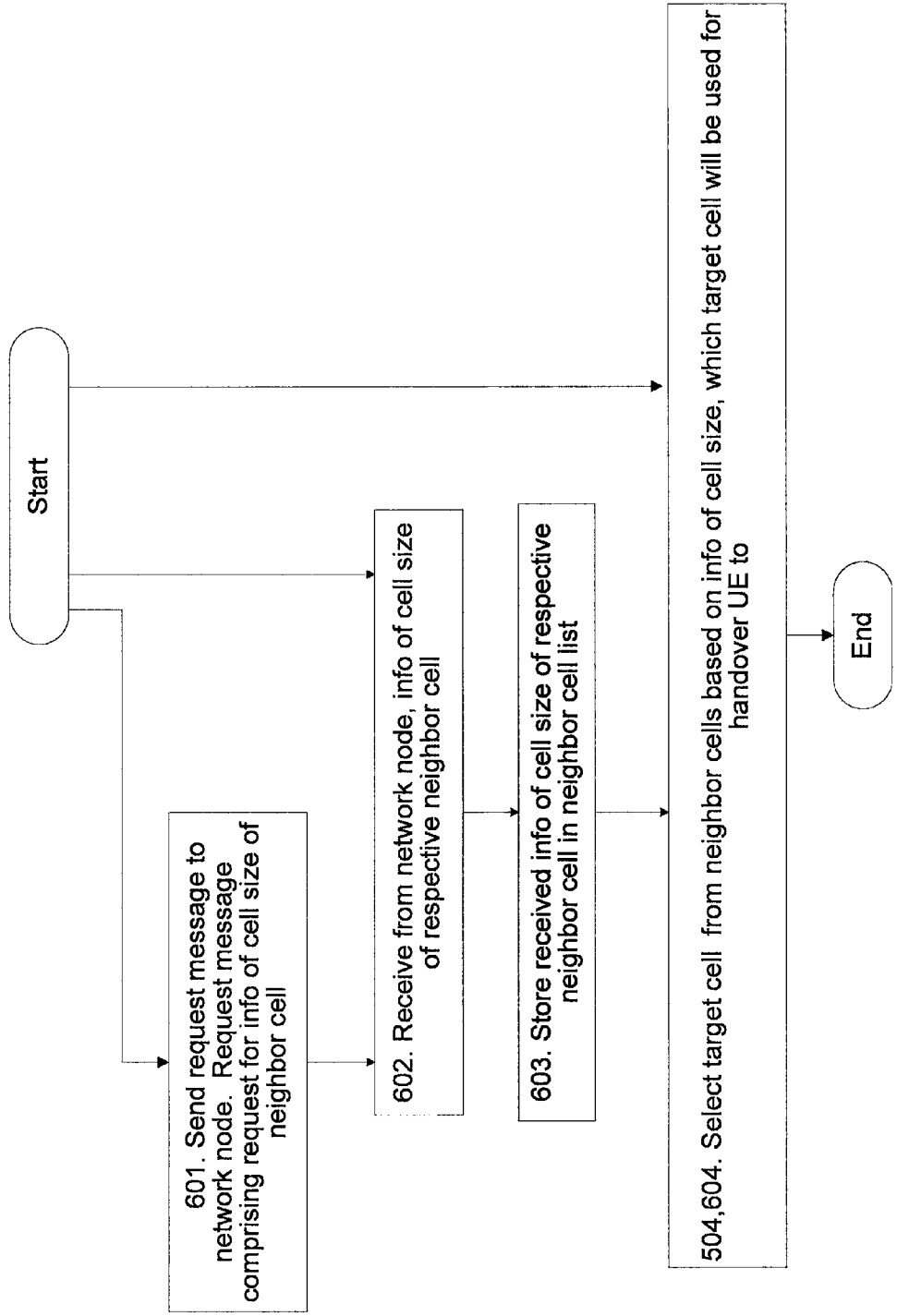
FIG. 6 is a flow diagram illustrating embodiments of a method in a first network node in more detail.

The method described above will now be described seen from the perspective of the first network node 301. FIG. 5 is a flowchart describing the present method in the first network node 301, for handling handover of a user equipment 105 from a source cell 303 to a target cell 309 in a communication network 300. FIG. 6 is a flowchart describing the present method in the first network node 301 in more detail. The first network node 301 comprises information about respective neighbor cells 309 being neighbors to the source cell 303. The first network node 301 may be a base station, for example in a LTE case, or a radio network node in a GSM or WCDMA case. A radio network node may be a radio network controller or a base station controller. In some embodiments, the first network node 301 may receive information from the user equipment 105 that a neighbor cell 309 is detected and add the detected at least one neighbor cell 309 to the neighbor cell information. The second network node 307 may be one of an eNodeB, user equipment 105, Base Station Controller, Radio Network Controller, Serving GPRS Support Node, Mobile Station Controller and Mobility Management Entity.

The most general way of describing the present solution method comprises the following step Step 504

The first network node 301 selects a target cell 309 from neighbor cells based on information of cell size. The target cell 309 will be used for handover the user equipment 105 to.

In more detail, the method comprises the steps to be performed in the first network node 301, which steps may be performed in any suitable order as understood by a person skilled in the art:

Step 601

In some embodiments, the first network node 301 may send a request message to a second network node 307. The request message may comprise a request for information cell size of at least one respective neighbor cell 309.

The request message may be an X2 Setup request message.

The request message may be a Radio Access Network Information Management request message, referred to as RIM request.

Step 602

In some embodiments, the first network node 301 receives from the second network node 307, information of cell size of at least one respective neighbor cell 309. The neighbor cell is neighbor to the source cell 303.

The information of cell size may be comprised in an X2 setup response message. The information of cell size may be comprised in an eNB configuration update message. The information of cell size may be comprised in an extended ANR response message. The information of cell size may be comprised in a handover request message. The information of cell size may be comprised in a RIM response message. The information of cell size may be in a system information message.

Step 603

In some embodiments, the first network node 301 stores the received information of cell size of the at least one respective neighbor cell 309.

The information of cell size may be comprised in a neighbor cell list.

Steps 604

This step corresponds to step 504 in FIG. 5. The first network node 301 selects a target cell 309 from neighbor cells based on information of cell size. The target cell 309 will be used for handover the user equipment 105 to.

In some embodiments, the first network node 301 selects a target cell 309 from neighbor cells 309 comprised in a neighbor cell list based on information of cell size stored in the neighbor cell list. The target cell 309 will be used for handover the user equipment 105 to.

A neighbor cell 309 may not be selected as target cell if the sell size is smaller than a predetermined value.

Figure 7:
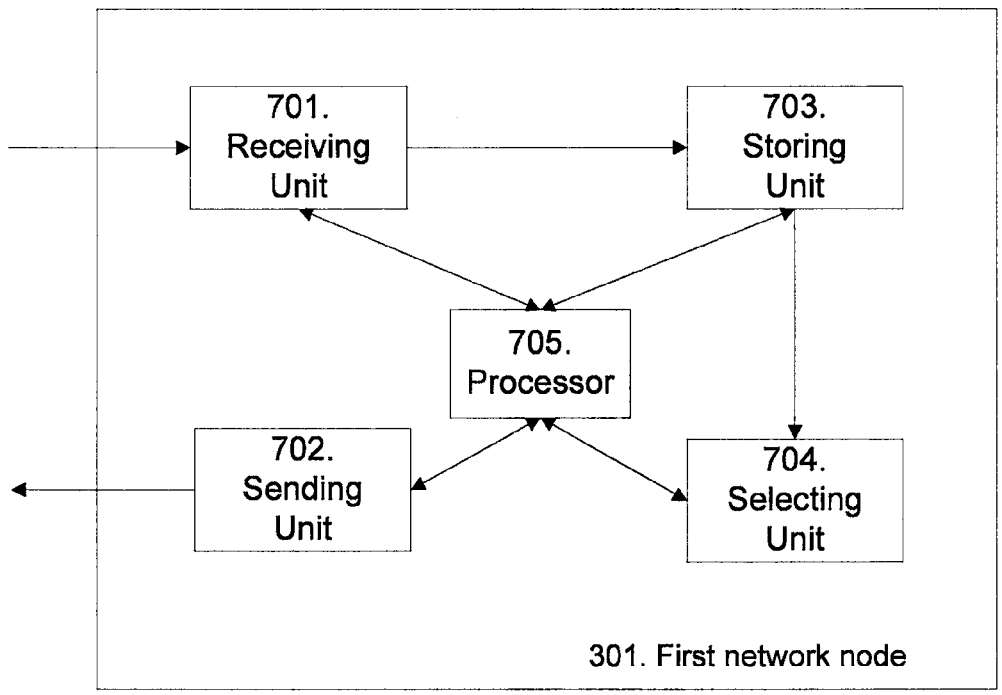
FIG. 7 is a block diagram illustrating embodiments of a first network node.

To perform the method steps shown in FIGS. 5 and 6 for handling handover of a user equipment 105 from a source cell 303 to a target cell 309 in a communication network 300 the first network node 301 comprises a first network node arrangement as shown in FIG. 7. The communication network 300 comprises a base station 301 controlling the source cell 303 and being in communication with the user equipment 105. The first network node 301 comprises information about respective neighbor cells 309 being neighbors to the source cell 303.

In some embodiments, the first network node 301 comprises a receiving unit 701 configured to receive from a second network node 307, information of cell size of at least one respective neighbor cell 309. The neighbor cell is neighbor to the source cell 303. The second network node 307 may be one of an eNodeB, user equipment 105, Base Station Controller, Radio Network Controller, Serving GPRS Support Node, Mobile Station Controller and Mobility Management Entity. The information of cell size may be comprised in a neighbor cell list. The receiving unit 701 may further be configured to receive information from the user equipment 105 that a neighbor cell 309 is detected.

The first network node 301 may further comprise a sending unit 702 configured to send a request message to the second network node 307. The request message comprises a request for information of cell size of at least one respective neighbor cell 309. The request message may be an X2 Setup request message, and the information of cell size may be comprised in an X2 setup response message. The request message may be a Radio Access Network Information Management request message, referred to as RIM request. Further, the information of cell size may be comprised in an eNB configuration update message. Even further, the information of cell size may be comprised in a system information message. The information of cell size may be comprised in a handover request message. The information of cell size may be comprised in a RIM response message.

In some embodiments, the first network node 301 further comprises a storing unit 703 configured to store the received information of cell size of the at least one respective neighbor cell 309. The information of cell size may be stored in a neighbor cell list. The storing unit 703 may be further configured to add the detected at least one neighbor cell 309 to the neighbor cell list.

Further, the first network node 301 comprises a selecting unit 704 configured to select a target cell from the neighbor cells 309 based on the information of cell size. The target cell will be used for handover the user equipment 105 to. A neighbor cell 309 may not be selected as target cell if the cell size is smaller than a predetermined value. In some embodiments, the selecting unit 704 is configured to select a target cell 309 from neighbor cells 309 comprised in a neighbor cell list based on information of cell size stored in the neighbor cell list.

Figure 8:
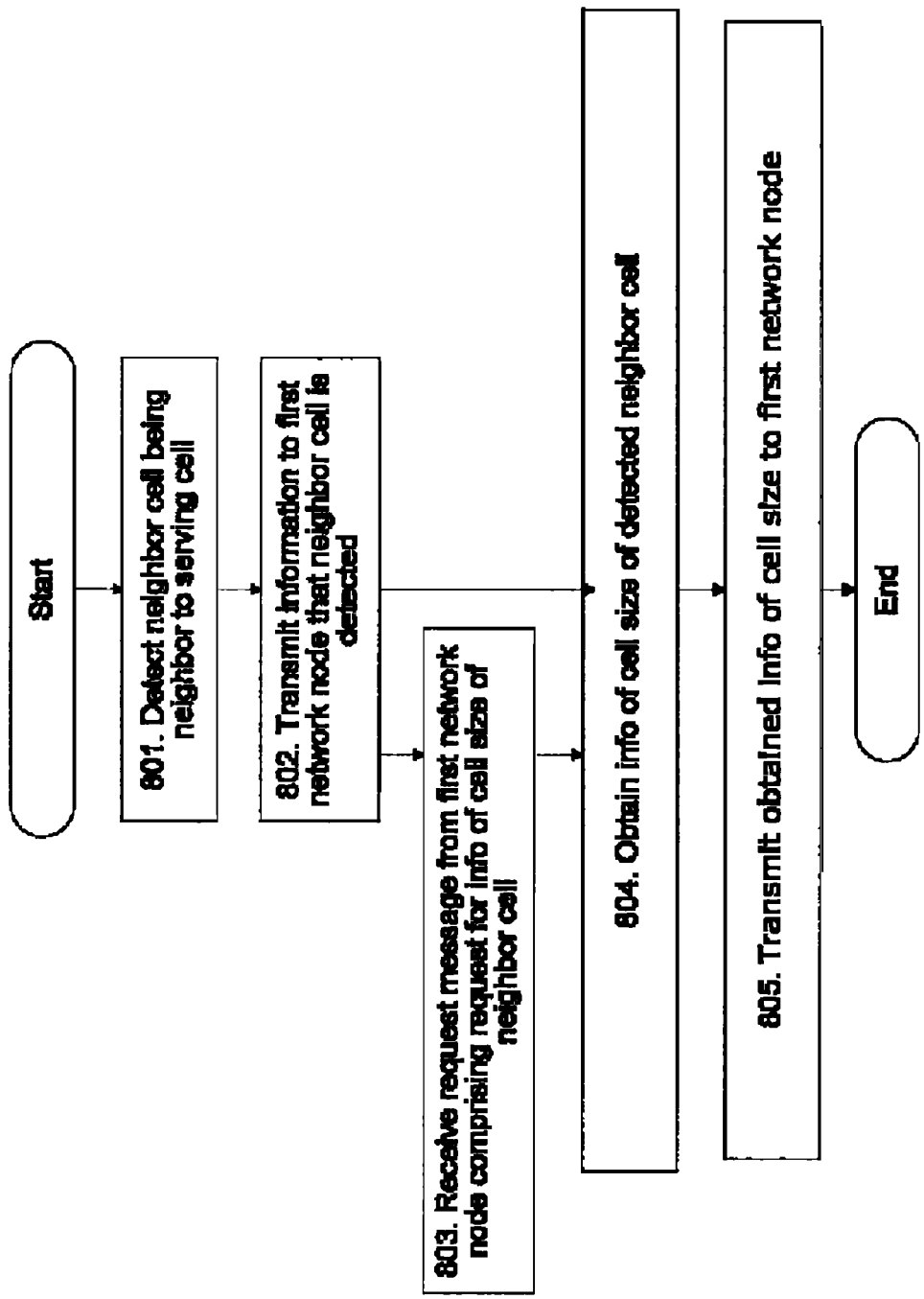
FIG. 8 is a flow diagram illustrating embodiments of a method in a user equipment.

The method described above will now be described seen from the perspective of the user equipment 105. FIG. 8 is a flowchart describing the present method in the user equipment 105, for handling information of cell size. As mentioned above, the user equipment 105 is in communication with the first network node 301 controlling a source cell 303.

The method comprises the steps to be performed in the user equipment 105, which steps may be performed in any suitable order as understood by a person skilled in the art:

Step 801

The user equipment 105 detects a neighbor cell 309 being a neighbor to the source cell 303.

Step 802

The user equipment 105 transmits information to the first network node 301 that the neighbor cell 309 is detected. The first network node 301 may be a base station, eNodeB, RNC or BSC.

Step 803

In some embodiments, the user equipment 105 receives a request message from the first network node 301 comprising a request for information of cell size of the at least one neighbor cell 309.

Step 804

The user equipment 105 obtains information of cell size of the detected neighbor cell 309.

Step 805

The user equipment 105 transmits the obtained information of cell size to the first network node 301 enabling the first network node 301 to handle handover of the user equipment 105 from the source cell 303 to a target cell. A neighbor cell 309 may not be selected as target cell if the cell size is smaller than a predetermined value.

Figure 9:
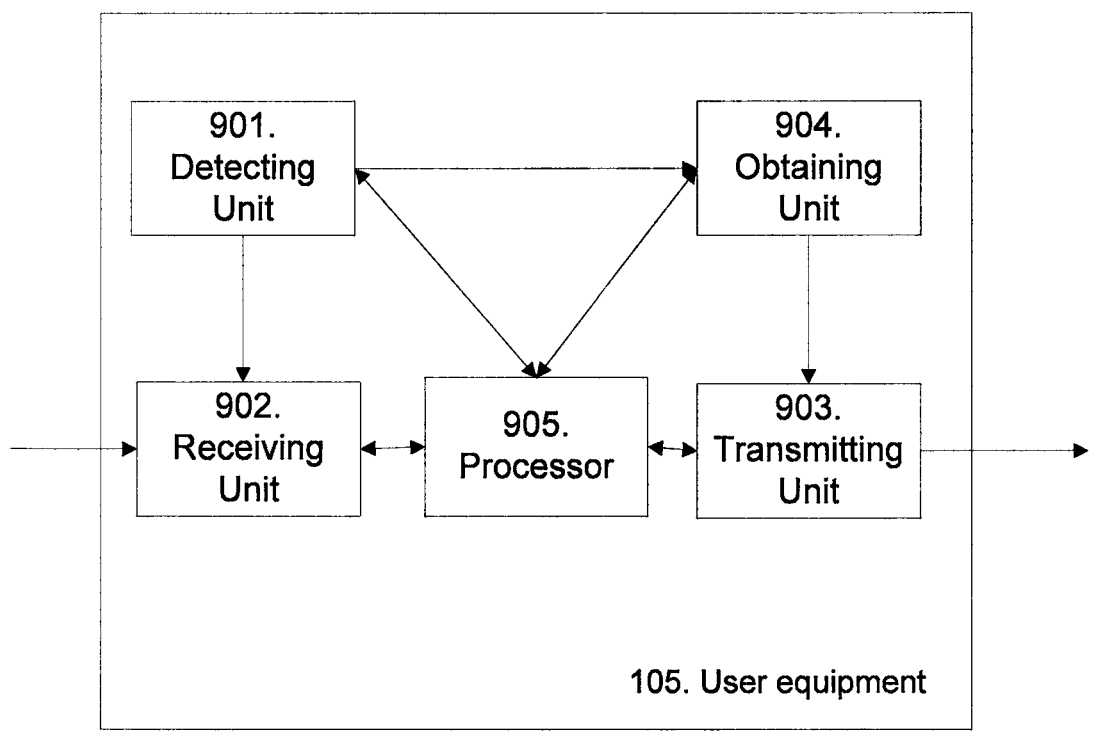
FIG. 9 is a block diagram illustrating embodiments of a user equipment.

To perform the method steps shown in FIG. 8 for handling information of cell size the user equipment 105 comprises a user equipment arrangement as shown in FIG. 9. The user equipment 105 is in communication with a first network node 301 controlling a source cell 303.

The user equipment 105 comprises a detecting unit 901 configured to detect a neighbor cell 309 being a neighbor to the source cell 303.

In some embodiments, the user equipment 105 comprises a receiving unit 902 configured to receive a request message from the first network node 301 comprising a request for information of cell size of the at least one neighbor cell 309.

The user equipment 105 further comprises a transmitting unit 903 which is configured to transmit information to the first network node 301 that the neighbor cell 309 is detected. The transmitting unit 903 is further configured to transmit the obtained information of cell size to the first network node 301 enabling the first network node 301 to handle handover of the user equipment 105 from a source cell 303 to a target cell 309.

Further, the user equipment 105 comprises an obtaining unit 904 configured to obtain information of cell size of the detected neighbor cell 309.

The present mechanism for handling handover of a user equipment 105 from a source cell 303 to a target cell 309 in a communication network 300 may be implemented through one or more processors, such as a processor 705 in the first network node 301 depicted in FIG. 7 and a processor 905 in the user equipment 105 depicted in FIG. 9, together with computer program code for performing the functions of the present solution. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the present solution when being loaded into the user equipment 105 and/or first network node 301. One such carrier may be in the form of a CD ROM disc. It is however feasible with other data carriers such as a memory stick. The computer program code may furthermore be provided as pure program code on a server and downloaded to the user equipment 105 and/or first network node 301 remotely.

The present solution is not limited to the above described preferred embodiments. Various alternatives, modifications and equivalents may be used. Therefore, the above embodiments should not be taken as limiting the scope of the solution, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the steps of the methods defined in the appended claims may, without departing from the present solution, be performed in another order than the order in which they appear in the claims.

The invention claimed is:

1. A method in a first network node for handling handover of a user equipment from a source cell to a target cell in a communication network, the method comprising:
   sending a Radio Access Network Information Management (RIM) request message to a second network node, the RIM request message comprising a request for information of cell size of at least one respective neighbor cell neighboring the source cell;
   receiving, from the second network node, a RIM response message comprising the information of cell size of the at least one respective neighbor cell, after sending the RIM request message comprising the request for the information of cell size of the at least one respective neighbor cell;
   storing the information of cell size of the at least one respective neighbor cell in a neighbor cell list; and
   selecting the target cell from neighbor cells in the neighbor cell list based on the information of cell size stored in the neighbor cell list, wherein the user equipment will be handed over to the target cell.

2. The method according to claim 1, wherein a neighbor cell is not selected as the target cell if the cell size is smaller than a predetermined value.

3. The method according to claim 1, wherein the information of cell size is comprised in a handover request message.

4. The method according to claim 1,
   wherein the second network node is one of an eNodeB, user equipment, Base Station Controller, Radio Network Controller, Serving GPRS Support Node, Mobile Station Controller and Mobility Management Entity.

5. A first network node for handling handover of a user equipment from a source cell to a target cell in a communication network, the first network node comprising:
   a processor configured to:
      send a Radio Access Network Information Management (RIM) request message to a second network node, the RIM request message comprising a request for information of cell size of at least one respective neighbor cell neighboring the source cell;
      receive, from the second network node, a RIM response message comprising the information of cell size of the at least one respective neighbor cell, after sending the RIM request message comprising the request for the information of cell size of the at least one respective neighbor cell;
      store the information of cell size of the at least one respective neighbor cell in a neighbor cell list; and
      select the target cell from neighbor cells in the neighbor cell list based on the information of cell size stored in the neighbor cell list, wherein the user equipment will be handed over to the target cell.

6. The method of claim 1, wherein:
   the second network node comprises a Mobility Management Entity (MME) that routes the RIM request message to a Base Station Controller (BSC) controlling the target cell and that receives the RIM response message comprising the information of cell size of the at least one respective neighbor cell from the BSC;
   sending the RIM request message comprises sending the request for the information of cell size of the at least one respective neighbor cell neighboring the source cell to the MME that routes the RIM request message to the BSC controlling the target cell; and
   receiving the RIM response message comprises receiving, from the MME that receives the RIM response message from the BSC, the information of cell size of the at least one respective neighbor cell.

7. The method of claim 6, wherein:
   the MME routes the RIM request message to the BSC via a Serving General Packet Radio Service (GPRS) Support Node (SGSN);
   the RIM response message comprising the information of cell size of the at least one respective neighbor cell originates at the BSC and is routed to the MME via the SGSN;
   sending the RIM request message comprises sending the request for the information of cell size of the at least one respective neighbor cell neighboring the source cell to the MME that routes the RIM request message to the BSC via the SGSN; and
   receiving the RIM response message comprises receiving, from the MME that receives the RIM response message from the BSC via the SGSN, the information of cell size of the at least one respective neighbor cell.

* * * * *